United States Patent
Wang et al.

(10) Patent No.: US 11,481,425 B2
(45) Date of Patent: Oct. 25, 2022

(54) AUTOMATIC GENERATION OF PRESENTATION SLIDES FROM DOCUMENTS

(71) Applicant: International Business Machines Corporation, Armonk, NY (US)

(72) Inventors: Dakuo Wang, Cambridge, MA (US); Yufang Hou, Dublin (IE); Xin Ru Wang, San Jose, CA (US); Yunfeng Zhang, Chappaqua, NY (US); Chuang Gan, Cambridge, MA (US); Edward Sun, Clifton, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/181,397

(22) Filed: Feb. 22, 2021

(65) Prior Publication Data
US 2022/0269713 A1    Aug. 25, 2022

(51) Int. Cl.
*G06F 16/43* (2019.01)
*G06F 16/438* (2019.01)
*G06F 16/34* (2019.01)
*G06N 20/00* (2019.01)
*G06K 9/62* (2022.01)
*G06V 30/416* (2022.01)

(52) U.S. Cl.
CPC ........ *G06F 16/4393* (2019.01); *G06F 16/345* (2019.01); *G06K 9/6263* (2013.01); *G06N 20/00* (2019.01); *G06V 30/416* (2022.01)

(58) Field of Classification Search
CPC ... G06F 16/4393; G06F 16/345; G06N 20/00; G06V 30/416; G06K 9/6263

USPC ........................................................ 715/202
See application file for complete search history.

(56) References Cited

U.S. PATENT DOCUMENTS

| 10,230,731 B2 | 3/2019 | Weaver |
| 10,460,023 B1 | 10/2019 | Shriver |
| 10,671,955 B2 | 6/2020 | Powers |

(Continued)

OTHER PUBLICATIONS

Health Sciences Programs; How To Create a Narrated Powerpoint Presentation.

(Continued)

*Primary Examiner* — Hope C Sheffield
(74) *Attorney, Agent, or Firm* — Fleit Intellectual Property Law; Jeffrey N. Giunta

(57) ABSTRACT

Systems and methods for creating presentation slides. A slide title is received and portions of source documents relevant to the title are identified based on a dense vector information retrieval machine learning process. An abstractive summary of the portions is generated based on a long form question answering machine learning process. A first presentation slide is created with the abstractive summary and the title. The first presentation slide is presented to an operator and an input indicating one of accepting or rejecting the abstractive summary is received. Based on the input that indicating rejecting the abstractive summary, the abstractive summary is removed from the presentation slide and negative training feedback for the abstractive summary is provided to at least one of the dense vector information retrieval machine learning process or the long form question answering machine learning process.

20 Claims, 8 Drawing Sheets

(56) References Cited

U.S. PATENT DOCUMENTS

| | | | |
|---|---|---|---|
| 10,733,372 B2 | 8/2020 | Kumar | |
| 2003/0222900 A1* | 12/2003 | Schramm-Apple | G16H 70/20 715/730 |
| 2020/0151263 A1* | 5/2020 | Markowski | G06F 16/93 |
| 2020/0183552 A1* | 6/2020 | Balasubramanian | G06F 3/14 |
| 2020/0327432 A1* | 10/2020 | Doebelin | G06N 5/02 |
| 2021/0182328 A1* | 6/2021 | Rollings | G06F 16/313 |
| 2021/0279638 A1* | 9/2021 | Kano | G06K 9/6215 |

OTHER PUBLICATIONS

Hu, Y. et al.; PPSGEN: Learning To Generate Presentation Slides for Academic Papers.

IPCOM000022407D; Methods for the Automatic Creation of Powerpoint Slides From Tagged Presentation Content.

IPCOM000214403D; Method of Dynamically Presenting Content By Considering Navigational Context To Dynamically Manipulate Content in a Presentation.

IPCOM000255848D; Method and System for Dynamically Creating Presentation of Content for a Target Audience Using Artificial Intelligence.

IPCOM000257142D; Intelligent Presentation Slide Assistant.

Nicholls, M.; Presentation Authoring—Microsoft Powerpoint Step By Step Guide.

\* cited by examiner

AUTOMATIC GENERATION OF PRESENTATION SLIDES FROM DOCUMENTS

BACKGROUND

The present disclosure generally relates to the field of creating presentation information from source documents, and more particularly to using machine learning process to assist in the creation of such presentation information.

Presentation slides are often used as visually effective tools in summarizing and explaining information to an audience. Manually creating such presentation slides, however, can be tedious and time-consuming. In some instances, it is desirable to create presentation slides based on documents that have already been created either by the creator of the presentation slides or by someone else.

Various methods can be used to automatically generate presentations from one or more source documents, including heuristic rule-based mechanisms to extract information from the document and use those as the generated-slide's content. Other techniques use machine learning (ML) approaches to learn the importance of sentences in the document, and extract those sentences as the slide content.

Conventional techniques include processing that primarily rely on extractive-based mechanism, thus disadvantageously generating content that is merely an aggregation of raw sentences from the document. Some conventional techniques disadvantageously assume the presentation slide's title has a one-to-one match to the document's subtitles or section headlines, whereas a person creating presentation slides often uses new phrases as a slide title and may create multiple slides under the same title, e.g., the slides have titles that include Cont./Continue.

BRIEF SUMMARY

In one example, a method for creating presentation slide includes receiving a title for a presentation slide and identifying portions of at least one source document that are relevant to a meaning of the title based on a dense vector information retrieval machine learning process operating on the at least one source document. The method further includes generating an abstractive summary of the portions of the at least one source document based on a long form question answering machine learning process, creating a first presentation slide comprising the abstractive summary and the title, and presenting the first presentation slide to an operator. The method also includes receiving, based on presenting the abstractive summary, an input indicating rejection of the abstractive summary. The method further, and based on receiving the input that indicates rejection of the abstractive summary, includes removing the abstractive summary from the presentation slide, and providing negative training feedback for the abstractive summary to at least one of the dense vector information retrieval machine learning process or the long form question answering machine learning process.

In some examples the method is also able to include receiving at least one keyword associated with the presentation slide, and in those examples the generating an abstractive summary of the portions of the at least one source document is further based on a combination of the at least one keyword and the title. In some examples the method is also able to include receiving at least one keyword associated with the presentation slide, and in those examples the identifying portions of at least one source document that are relevant to a meaning of the title is further based on the at least one keyword. In some examples the method is also able to include determining, by the dense vector information retrieval machine learning process prior to identifying portions of at least one source document, a respective vector representation for each respective text snippet within the at least one source document, and in such examples identifying portions of at least one source document that are relevant to a meaning of the title based on the dense vector information retrieval machine learning process on the at least one source document includes: computing a respective pairwise inner product between each respective vector representation of each respective snippet and a vector representation of the title; ranking each respective snippet based performing a maximum inner product search of all respective pairwise inner products; and identifying, based on ranking each respective snippet, a selected number of the respective snippets as the portions. In some examples the method is also able to include receiving a set of training presentation slides comprising a first training slide and a second training slide; creating a negative sample slide comprising a title from the first training slide and content other than a title from the second training slide; and training the dense vector information retrieval machine learning process based on the negative sample slide being a negative example. In some examples of the method, the long form question answering machine learning process further identifies, in the at least one source document, a number of top ranked text snippets that relate to the title, and in such examples generating the abstractive summary includes the long form question answering machine learning process generating the abstractive summary further based on a context comprising a concatenation of the number of top ranked text snippets. In some examples the method is also able to include receiving a training data set comprising training documents and training presentation slides created from the training documents; filtering the training data set by removing test from the training presentation slides that is not derivable from the training documents to create a filtered training data set; and training the long form question answering machine learning process with the filtered training data set. In some examples the method is also able to have the at least one source document include at least one visual object, has the identifying portions of at least one source document that are relevant to a meaning of the title include identifying a relevant visual object from within the at least one visual object that is relevant to the title, and has creating the first presentation slide include adding the relevant visual object to the first presentation slide.

In another example, an apparatus for creating presentation slides includes a processor, a memory coupled to the processor and a user interface coupled to the processor and the memory that is configured to, when operating, receive a title for a presentation slide. The apparatus also includes a presentation slide generator, coupled to the processor and the memory, that when operating is configured to identify portions of at least one source document that are relevant to a meaning of the title based on a dense vector information retrieval machine learning process operating on the at least one source document. The presentation slide generator is also configured to, when operating, generate an abstractive summary of the portions of the at least one source document based on a long form question answering machine learning process, and create a first presentation slide comprising the abstractive summary and the title. The user interface is further configured to, when operating, present the first presentation slide to an operator, and receive, based on presenting the abstractive summary, an input indicating rejection of the abstractive summary. The presentation slide generator is further configured to, when operating, based on receiving the input that indicates rejection of the abstractive summary, removing the abstractive summary from the presentation slide, and providing negative training feedback for the abstractive summary to at least one of the dense vector information retrieval machine learning process or the long form question answering machine learning process.

In some examples, the user interface of the apparatus is further configured to, when operating receive at least one keyword associated with the presentation slide and the presentation slide generator in such examples is also configured to, when operating, generate an abstractive summary of the portions of the at least one source document further based on a combination of the at least one keyword and the title. In some examples, the user interface of the apparatus is further configured to, when operating receive at least one keyword associated with the presentation slide and the presentation slide generator in such examples is further configured to, when operating, identify portions of at least one source document that are relevant to a meaning of the title further based on the at least one keyword. In some examples the presentation slide generator of the apparatus is further configured to, when operating: determine, by the dense vector information retrieval machine learning process prior to identifying portions of at least one source document, a respective vector representation for each respective text snippet within the at least one source document, and such examples also identify portions of at least one source document that are relevant to a meaning of the title based on a dense vector information retrieval machine learning process on the at least one source document by at least: computing a respective pairwise inner product between each respective vector representation of each respective snippet and a vector representation of the title; ranking each respective snippet based performing a maximum inner product search of all respective pairwise inner products; and identifying, based on ranking each respective snippet, a selected number of the respective snippets as the portions. In some examples, the apparatus also includes a training processor that is configured to, when operating: receive a set of training presentation slides comprising a first training slide and a second training slide; create a negative sample slide comprising a title from the first training slide and content other than a title from the second training slide; and train the dense vector information retrieval machine learning process based on the negative sample slide being a negative example. In other examples, the long form question answering machine learning process of the apparatus also identifies, in the at least one source document, a number of top ranked text snippets that relate to the title, and the presentation slide generator in such examples is further configured to, when operating, generate the abstractive summary by at least the long form question answering machine learning process generating the abstractive summary further based on a context comprising a concatenation of the number of top ranked text snippets. The apparatus in some examples also includes a training processor that is configured to, when operating: receive a training data set comprising training documents and training presentation slides created from the training documents; filter the training data set by removing text from the training presentation slides that is not derivable from the training documents to create a filtered training data set; and train the long form question answering machine learning process with the filtered training data set. In some examples, the at least one source document comprises at least one visual object, and the presentation slide generator of the apparatus in such examples is further configured to, when operating, identify portions of at least one source document that are relevant to a meaning of the title by at least identifying a relevant visual object from within the at least one visual object that is relevant to the title, and create the first presentation slide by at least adding the relevant visual object to the first presentation slide.

In yet another example, a computer program product for creating presentation slides includes a storage medium readable by a processing circuit and storing instructions for execution by a processing circuit for performing a method that includes receiving a title for a presentation slide, and identifying portions of at least one source document that are relevant to a meaning of the title based on a dense vector information retrieval machine learning process operating on the at least one source document. The method further includes generating an abstractive summary of the portions of the at least one source document based on a long form question answering machine learning process, creating a first presentation slide comprising the abstractive summary and the title, and presenting the first presentation slide to an operator. The method also includes receiving, based on presenting the abstractive summary, an input indicating rejecting the abstractive summary. Based on receiving the input that indicates rejection of the abstractive summary, the method further includes removing the abstractive summary from the presentation slide, and providing negative training feedback for the abstractive summary to at least one of the dense vector information retrieval machine learning process or the long form question answering machine learning process.

In some examples, the method performed by the processing circuits executing the instructions stored on the storage medium of the computer program product also includes determining, by the dense vector information retrieval machine learning process prior to identifying portions of at least one source document, a respective vector representation for each respective text snippet within the at least one source document, and in such examples the method also includes identifying portions of at least one source document that are relevant to a meaning of the title by using a dense vector information retrieval machine learning process on the at least one source document that includes: computing a respective pairwise inner product between each respective vector representation of each respective snippet and a vector representation of the title; ranking each respective snippet based performing a maximum inner product search of all respective pairwise inner products; and identifying, based on ranking each respective snippet, a selected number of the respective snippets as the portions. In some examples, the method performed by the processing circuits executing the instructions stored on the storage medium of the computer program product also includes receiving a set of training presentation slides comprising a first training slide and a second training slide; creating a negative sample slide comprising a title from the first training slide and content other than a title from the second training slide; and training the dense vector information retrieval machine learning process based on the negative sample slide being a negative example. In some examples, the method performed by the processing circuits executing the instructions stored on the storage medium of the computer program product also includes a long form question answering machine learning process that includes identifying, in the at least one source document, a number of top ranked text snippets that relate to the title, and the method in such an example also generates the abstractive summary by generating, with the long form question answering machine learning process, the abstractive summary also based on a context comprising a concatenation of the number of top ranked text snippets.

The above described methods, apparatus and computer program product advantageously address disadvantages with conventional approaches by allowing abstractive summaries for use in presentation slides to be automatically created from content extracted from one or more papers based on a user entered title for each presentation slide. These advantages in an example are based on providing an interactive two-step architecture that first allows users to input a short text as the slide title and then uses a Dense Vector information retrieval module to identify the most relevant portions (e.g., sections or sentences, as well as figures or tables) from the corresponding source document. The two-step architecture then uses a long form question answering machine learning process to generate the abstractive summary (answer) of the retrieved text based on the given slide title and use this as the final slide text content.

In some examples of these methods, apparatus and computer program products, user entered keywords, in addition to the user entered title, are advantageously used to allow a user to better define the criteria by which one or both of the extracted most relevant portions or the abstractive summaries are determined and thus results in the generation of more relevant abstractive summaries. In some examples of these methods, apparatus and computer program products, more relevant snippets are identified from which abstractive summaries can be generated by determining vector representations of each text snippet in a source document are determined prior to creating presentation slides, and the most relevant snippets are identified by ranking the highest respective pairwise inner products that are computed between a vector representation of the title and each text snippet. In some examples of these methods, apparatus and computer program products, the training of the machine learning models is advantageously improved by creating a negative sample slide comprising a title from the first training slide and content other than a title from the second training slide and using the negative sample slide as a negative sample to train the models. In some examples of these methods, apparatus and computer program products advantageously identifies visual objects, such as images, graphs, other visual objects, or combination of these, in the source document that are most relevant to the user entered title, or combination of title and keywords, by identifying a relevant visual object from within the at least one visual object that is relevant to the title and including that relevant visual object into the presentation slide.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various examples and to explain various principles and advantages all in accordance with the present disclosure, in which.

DETAILED DESCRIPTION

Figure 1:
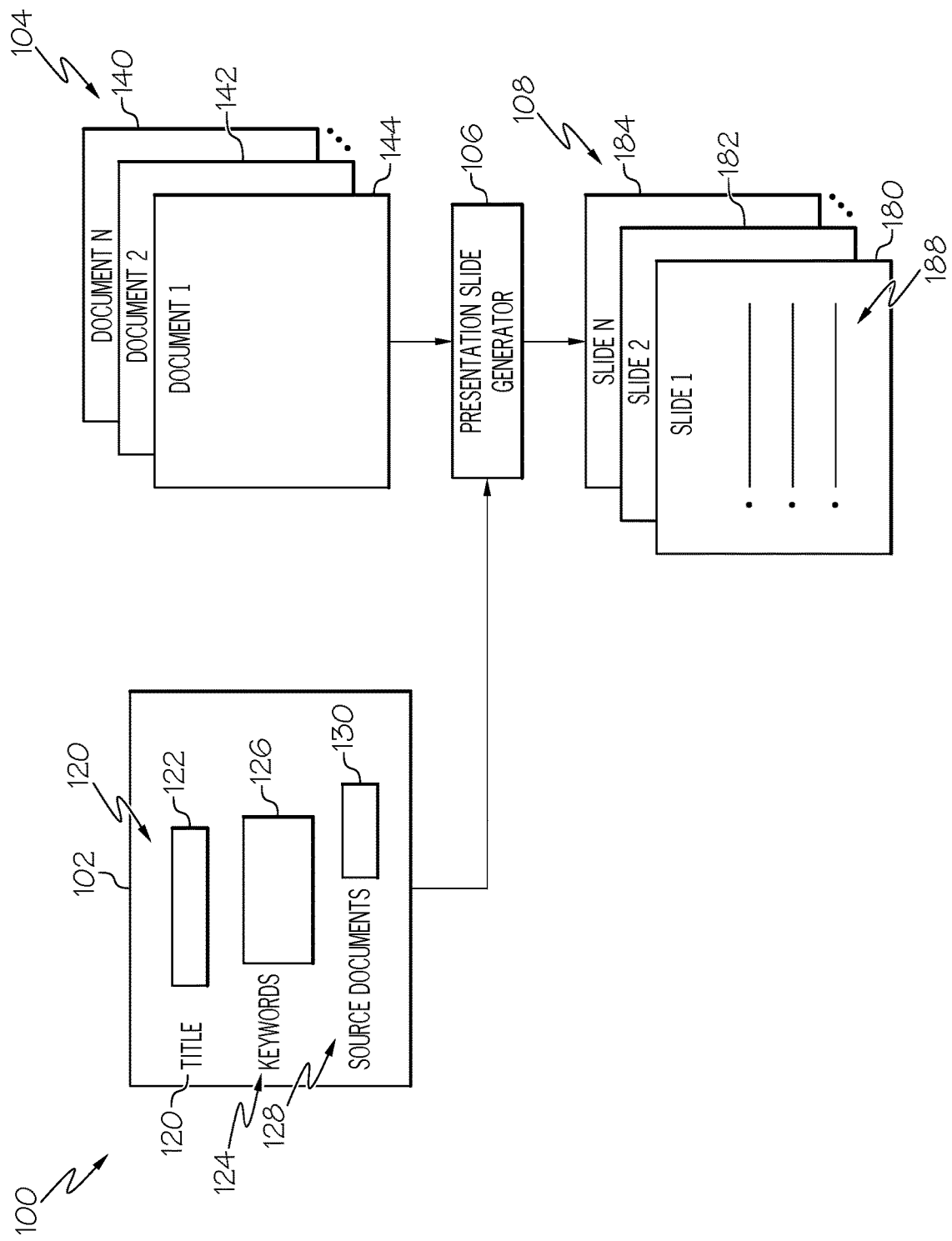
FIG. 1 illustrates an example automated presentation slide creation system, in accordance with one example.

The following description presents example systems and methods that advantageously utilize a combination of machine learning processes to assist a user in automatically generating presentation slides from one or more source documents. The below described systems and methods, in an example, perform a document-to-slides generation task as a Query-Based Single-Document Text Summarization (QSS) task that expands on Open-Domain Long-form Question Answering (QA) machine learning processing. In general, a user specifies one or more source documents to use as sources of information from which presentation slide information is to be determined.

Conventional techniques for automatically generating presentation slides from documents generally include techniques that rely on an extractive-based mechanism to generate content that is an aggregation of raw sentences from the document instead of abstractive summarization that are frequently desired as the content of presentation slides. Some conventional techniques for automatically creating presentation slides operate on an assumption that the presentation slide's title has a one-to-one match with the document's subtitles or section headlines, whereas in reality, the user creating the presentation slides often uses new phrases as a slide title and may create multiple slides with the same title text, such as slides with titles of "Cont." or "Continue."

In one example, the below described systems and methods include an interactive two-step architecture to create each presentation slide of a presentation. In a first step for a particular presentation slide, a user inputs a short amount of text as the slide title and is also able to enter keywords to further define the subject matter of the content that is to be created for that particular presentation slide. A Dense Vector Information Retrieval (IR) machine learning process in an example processes the user specified source documents to identify sections or sentences as well as figures/tables from those source documents that are most relevant to the user specified title text and any user specified keywords.

In a second step of such an example, the text that was retrieved in the first step by the dense vector information retrieval machine learning process is processed by a closed domain long-form question answering (QA) machine learning process to generate an abstractive summary of the most relevant sections or sentences that were identified based on the given slide title and any specified keywords. In an example, the closed domain long-form question answering (QA) machine learning process determines an answer to a question that is formed by the user entered slide title and any specified keywords. In some examples, keywords entered by the user augment the user entered title to further direct the processing by the dense vector information retrieval machine learning process and the closed domain long-form question answering (QA) machine learning process.

The QA process in an example is based on open-domain long-form question answering task, which are known processes in which the answers are long and can span multiple sentences. In an example, the user provided slide titles and any supplied keywords are questions and the one or more source documents are the corpus from which one or more answers are to be obtained. In an example, information retrieval (IR) is used to identify and collect the most relevant text snippets from the source documents for a given user supplied title text string. Those most relevant text snippets that are identified and collected by the IR are passed to a QA module for sequence-to-sequence generation. In an example, the processing of the QA module is improved by integrating title specific key phrases to guide the model to generate slide content.

In an example, a keyword processing module processes the source documents to extract a hierarchical discourse tree structure from the one or more user specified source documents. For a given user supplied title, keywords from the extracted tree structure are extracted and integrated into both the IR module and QA module.

FIG. 1 illustrates an example automated presentation slide creation system 100, in accordance with one example. The example automated presentation slide creation system 100 automatically creates one or more presentation slides 108 from one or more specified source documents 104 based on a title and in some cases keywords that are received from a user. The example automated presentation slide creation system 100 incorporates a combination of machine learning based processes with models that are designed and trained to create presentation slides 108 that have content suitable for presentation, such as presentation slide bullet points, based on information extracted from one or more specified source documents 104.

The example automated presentation slide creation system 100 includes a presentation slide generation processor 106 and a user interface 102. The presentation slide generation processor 106 receives and processes one or more source documents 104 and produces one or more presentation slides 108. In an example, a user is able to control the operation of the presentation slide generation processor 106 via the user interface 102.

The depicted user interface 102 shows input facilities that are used to control the generation of one presentation slide. The user interface 102 shows a presentation slide title entry facility 120, which includes the prompt "TITLE" along with a title entry field 122. The user interface 102 also has a keywords entry facility 124 which includes the prompt "KEYWORDS" and a keywords entry field 126. The user interface 102 also has a document selection facility 128 which includes a prompt "DOCUMENT SELECTION" and a file selector 130 that allows one or more document files to be selected as source documents to be used as sources of information to populate the content of generated presentation slides. In some examples, the file selector 130 allows one or more files to be selected to be used as source documents.

The depicted source documents 104 include first source document 144, a second source document 142, and an Nth source document 140. Source documents 104 in various examples are able to include any type documents, such as academic or research papers, reports, brochures, other types of documents, or combinations of these. In an example, the user interface 102 allows the user to specify only one source document file to be processed to create content for generated presentation slides, or multiple source document files are able to be specified.

The depicted presentation slides 108 include a first slide 180 with a first title 186, a second slide 182 with a second title 181, and an Nth slide 184 with an Nth title 183. The first title 186 is a title that a user entered via the user interface 102 and title entry field 122. The first slide 180 is also shown to have a first set of contents 188, which includes a number of presentation slide bullet points. The presentation slide bullet points in the first set of contents 188 in an example are each generated by processing within the presentation slide generation processor 106 that extracted the first set of content 188 from the source documents 104 based on the first title 186 that was entered in the title entry field 122 and on any keywords that the user provided via the user interface 102.

Figure 2:
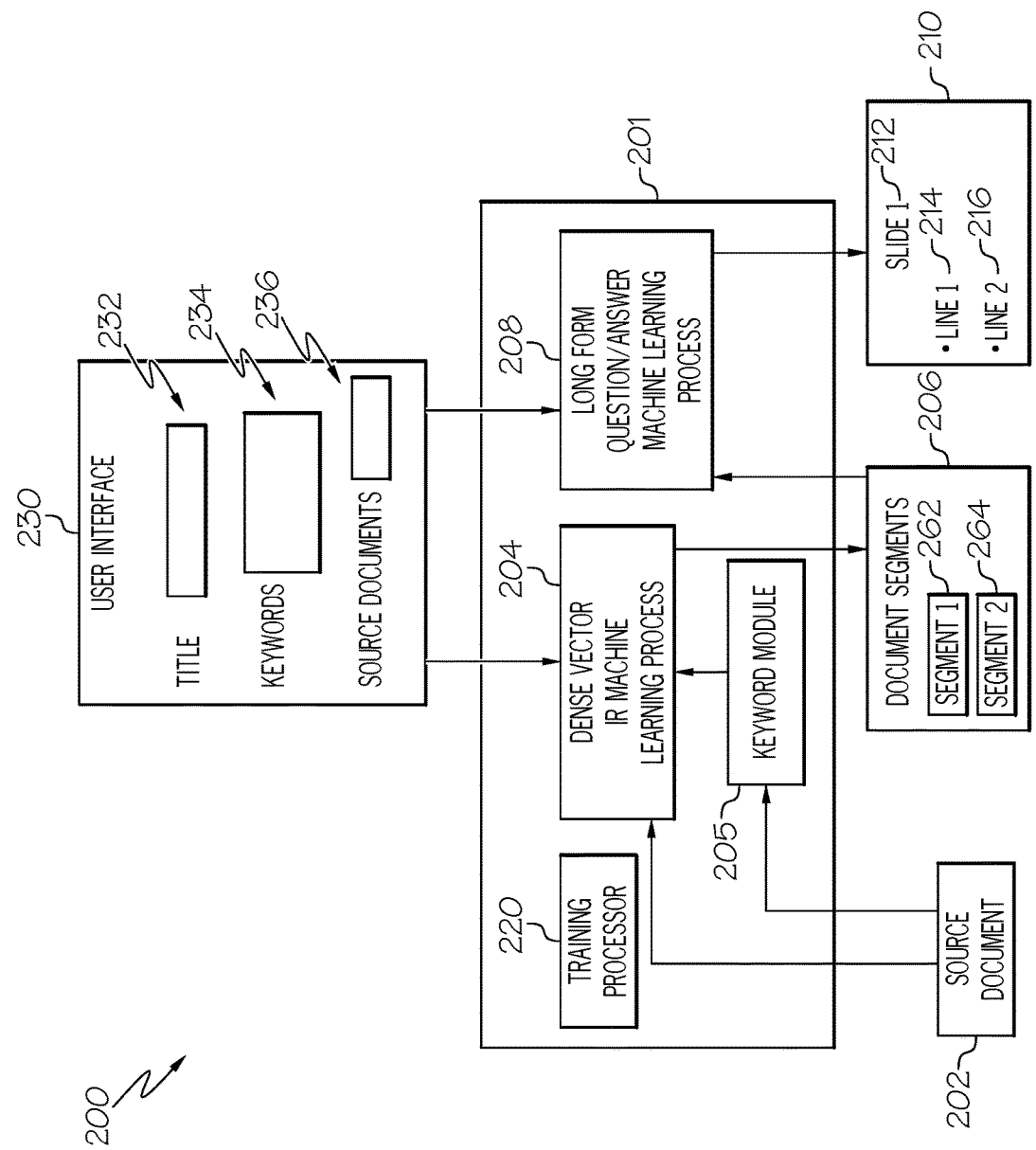
FIG. 2 illustrates a slide creation flow diagram, according to an example.

FIG. 2 illustrates a slide creation flow diagram 200, according to an example. The slide creation flow diagram 200 includes a presentation slide generation processor 201 and depicts the flow of processing performed when processing a source document 202 to create one presentation slide 210 based upon user entered information received via a user interface 230. In an example, the processing described below with regards to the slide creation flow diagram 200 is repeatedly performed for each presentation slide in a set of presentation slides that are used for a presentation.

With reference to the example automated presentation slide creation system 100, the presentation slide generation processor 201 is an example of the presentation slide generation processor 106, the user interface 230 is an example of the user interface 102, the source document 202 is an example of a document within the source documents 104, and the presentation slide 210 is an example of a presentation slide in the presentation slides 108.

The slide creation flow diagram 200 depicts a source document 202. The illustrated example depicts a single source document 202 that is received for further processing by the presentation slide generation processor 201 to create a presentation slide based on information contained in that source document. In further examples, any number of source documents are able to be received and processed and concurrently used as sources of information to generate presentation slides.

The user interface 230 includes a title entry facility 232 a keywords entry facility 234, and a source file selection facility 236. The user interface 230 in an example allows a user to enter information to direct the processing of the presentation slide generation processor 201. In an example, the title entry facility 232 allows a user to enter a title text string for a presentation slide 210 that is presently being created where that title text string is a basis for identifying the subject matter to be extracted from the source document 202 for inclusion into that presentation slide 210. The keywords entry facility 234 allows the user to enter keywords that are also able to be used to direct the processing of the presentation slide generation processor 201 in generating content for generated presentation slides.

The presentation slide generation processor 201 in an example includes, a keywords module 205, a dense vector information retrieval (IR) machine learning module 204, a closed-domain long-form question answering machine learning module 208, and a training processor 220. In an example, the dense vector information retrieval machine learning module 204 and the keywords module 205 receive and process the source document 202 as is described below in order to identify information to be used by further processing.

The keyword module 205 determines a hierarchical structure of section headers for the source document 202 that is provided to the dense vector information retrieval machine learning module 204 to further support its information retrieval processing. The keyword module 205 in an example generates a hierarchical structure of section headers based on a hierarchy of the source document 202 and the frequency of unspecified "weak" titles (e.g., Experiments or Results). Weak titles are undescriptive generic titles that are nearly identical to section headers. The length of sections associated with generic section headers may pose a challenge as many topics may be included in a single section. In an example, the keyword module constructs a parent-child tree of sections titles and subsections headings. The constructed hierarchical discourse structure in an example is used to support information retrieval and slide content generation based on information in the document. In some examples, the parent-child hierarchy generated by the keyword module 205 is not limited to core sections, e.g., sections 1, 2, 3, etc., but is also leveraged for all header matches in the source document 202, e.g., in the form x.x.x. For example, a title t that is associated with a header number 2.1 will result in including the title associated with header 2.1 as well as the title text of all of its recursive children, e.g., header numbers 2.1.x, 2.1.x.x, etc., also being included as keywords.

The dense vector information retrieval machine learning module 204 implements a dense vector information retrieval machine learning process that receives the source document 202 and processes it to identify and extract relevant document segments 206 from the source document 202 based on the title provided by the user in the title entry facility 232 and any user provided keywords provided via the keyword entry facility 234. Using user provided keywords to further direct information retrieval in some examples advantageously allows the user to more completely specify the subject matter that is desired for a particular presentation slide and allows the dense vector information retrieval machine learning module 204 to retrieve information that more relevant to the subject matter desired by the user. In an example, a dense vector information retrieval machine learning module 204 is based on a distilled BERT miniature. The Bidirectional Encoder Representation and transfers (BERT) is a known model that has been applied to information retrieval and known techniques can be applied to perform knowledge distillation, which is a compression technique in which a small model is trained to reproduce the behavior of a larger model. In such an example, the dense vector information retrieval machine learning module 204 precomputes vector representations that all have a common dimension for all text snippets within the source documents 202. In an example, the dense vector information retrieval machine learning module 204 processes the source document 202 as text snippets that are all four (4) sentence passages. The dense vector information retrieval machine learning module 204 also computes a dense vector representation that have the same common dimension for the user supplied slide title. In an example, respective pairwise inner products are computed between the vectors of all snippets from the source document 202 and the vector for the user supplied slide title. These inner products are used to measure the similarity between all title-snippet pairs, and the passage candidates from the source document 202 are ranked in terms of relevance to the user supplied title via a Maximum Inner Product Search. Computing inner product results as a basis of ranking text snippets advantageously provides a more efficient processing architecture to identify the most relevant text snippets. In an example, the ten (10) highest ranked candidates are selected as context for input to the QA Module and provided as the document segments 206. Ranking and selecting the highest ranked text snippets advantageously results in the most relevant text in the source documents being used as a bases for generating abstract summaries.

The dense vector information retrieval machine learning module 204 ranks the identified relevant document segments according to their relevance to the user provided slide title and keywords. These ranked document segments in an example are provided to the closed-domain long-form question answering machine learning module 208 as the document segments 206. In an example, text captions that are associated with visual content, such as figures, tables, and the like, in the source document 202 are identified and processed by the dense vector information retrieval machine learning module 204 as described above to determine their relevance to the title and keywords and rank those text captions according to that relevance. In an example, the visual content associated with the highest ranked text caption is provided as relevant visual object that is to be used as content to be included into the presentation slide being created.

In an example, the dense vector information retrieval machine learning module 204 is trained to minimize the cross-entropy loss of titles to their original content due to their similarity to snippets from the source documents. In an example, training of the dense vector information retrieval machine learning module 204 includes processing presentation slides of a training data set. In some examples, creating a training data set includes creating negative sample presentation slides from a set of presentation slides. In an example, negative sample presentation slides of the training data set are created by processing positive samples in the training data set. In an example, for each title "t" of each presentation slide, a negative sample presentation slide is crated that consists of the title "t" and contents from another randomly chosen slide that has a different title. This training method is found to advantageously allow the deep neural networks to first learn language understanding between slide title and the original slide content before transferring it onto snippets from the source document 202.

In some examples, the information retrieval reranking is improved by using extracted keywords. In an example, such processing uses a weighted ranking function using vector representations of title, passage text, and keywords such as:

$$\alpha(emb_{title} \bullet emb_{text}) + (1-\alpha)(emb_{title} \bullet emb_{keyword})$$

where emb is the embedding as represented by the vector representations of the text snippets and other words. In an example, the processing sets $\alpha=0.75$. This ranking function allows the processing to become more header-aware and robust.

The document segments 206 are processed by the closed-domain long-form question and answering machine learning module 208 as is discussed below in order to generate content to be inserted into the presentation slide with the title supplied by the user via the title entry facility 232. The closed-domain long-form question and answering machine learning module 208 in an example implements a long form question answering machine learning process. The closed-domain long-form question answering machine learning module 208 is referred to as closed domain because the supporting context is limited to the one or more documents provided by the user. While traditional open-domain QA have questions that are specific, nearly 40% of slide titles are generic (e.g., take home message, results). To generate meaningful answers (slide contents) for these generic questions (titles), title-related keywords are used to guide the system to retrieve and generate key talking points related to both the generic title and the specific keywords.

In an example, the closed-domain long-form question and answering machine learning module 208 combines the user supplied slide title and the user supplied corresponding keywords to use as a query and produces one or more abstractive summaries based on that query. Using user provided keywords to further direct the generation of abstractive summaries in some examples advantageously allows the user to more completely specify the subject matter that is desired for a particular presentation slide and allows the closed-domain long-form question and answering machine learning module 208 to generate abstractive summaries that more relevant to the subject matter desired by the user. In an example, the top ten ranked text snippets received from the dense vector information retrieval machine learning module 204 are concatenated and used as the context. The use of the closed-domain long-form question and answering machine learning module 208 advantageously provides abstractive summaries for use in presentation slides as opposed to conventional systems that perform extraction of literal text from the source documents and use that extracted literal text as the content for automatically generated presentation slides. The above described system advantageously combines obtaining ranked text snippets by the processing of the dense vector information retrieval machine learning module 204 that have been determined to be relevant to the title of the presentation slide with using a closed-domain long-form question and answering machine learning module 208 to process those ranked text snippets to produce abstractive summaries for use in presentation slides. This combination advantageously operates to produce abstractive summaries that are most likely to reflect the contents of source documents that are most relevant to the presentation slide title and any use entered keywords.

The question and answering model of the closed-domain long-form question and answering machine learning module 208 is fine-tuned on top of BART using a filtered training data. BART is a known processing consisting of a denoising autoencoder for pretraining sequence-to-sequence models. Filtering is done because the process of humans generating slides from a source document is highly abstractive and subjective to each author's unique style. Some may include anecdotes or details outside the source document. These underivable lines, if not filtered, may hinder the performance of the closed-domain long-form question and answering machine learning module 208 in generating faithful sentences from the source document 202.

The training processor 220 in an example handles processing associated with performing the machine learning based training of the dense vector information retrieval machine learning module 204 and the closed-domain long-form question answering machine learning module 208. In an example, the training processor 220 receives a set of training presentation slides comprising a first training slide and a second training slide, creates a negative sample slide comprising a title from the first training slide and content other than a title from the second training slide, and trains the dense vector information retrieval machine learning process based on the negative sample slide being a negative example. In an example, the training processor 220 receives a training data set comprising training documents and training presentation slides created from the training documents, filter the training data set by removing text from the training presentation slides that is not derivable from the training documents to create a filtered training data set, and train the long form question answering machine learning process with the filtered training data set. Such filtering advantageously improves the performance of machine learning models that are trained with the filtered training data due to the better correlation between the training presentation slides and the content of the source documents from which they are derived.

Figure 3:
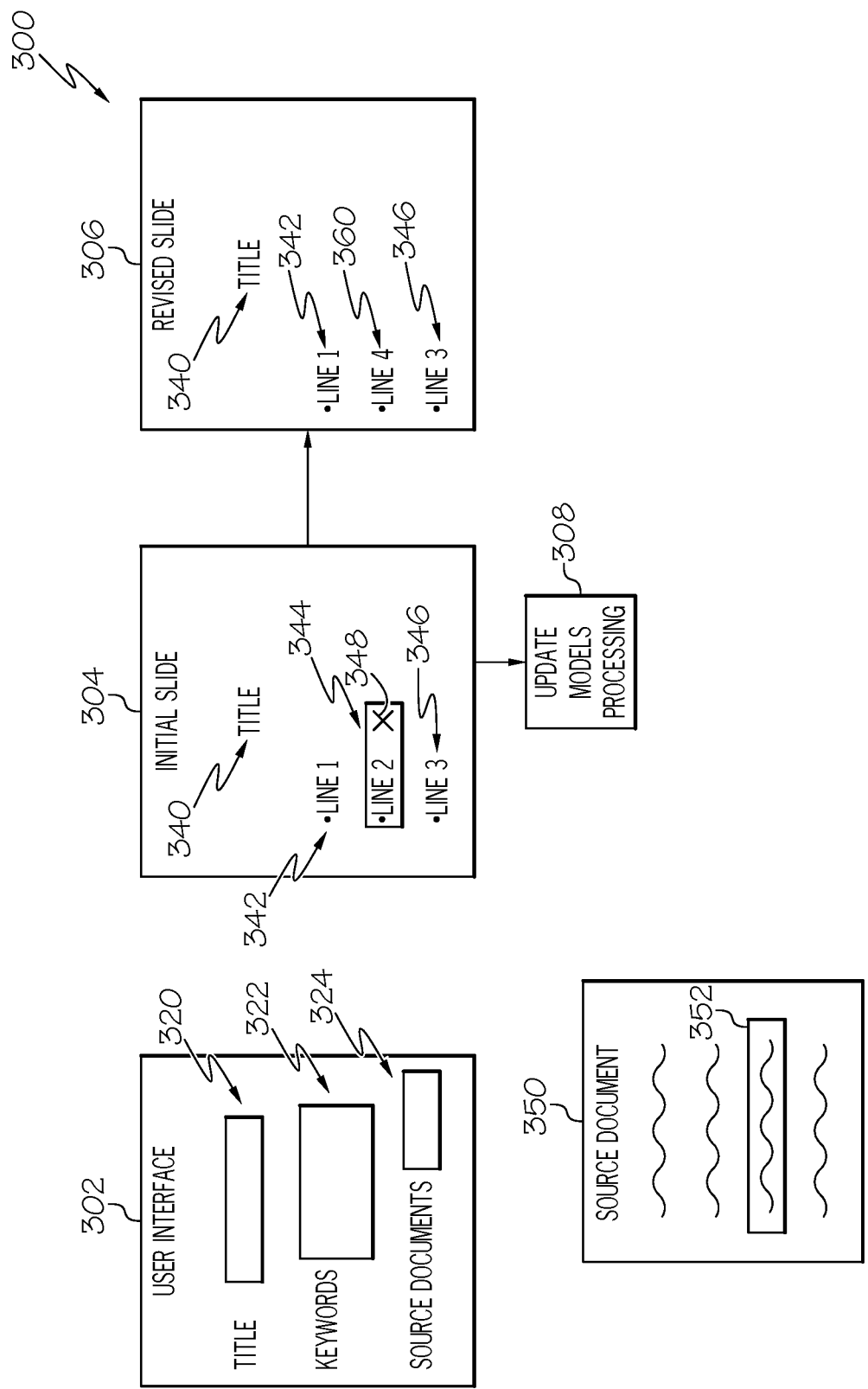
FIG. 3 illustrates a presentation slide review user interface flow, according to an example.

FIG. 3 illustrates a presentation slide review user interface flow 300, according to an example. The presentation slide review user interface flow 300 illustrates an example of user interfaces provided to a user in order to direct the automatic generation of presentation slides by the example automated presentation slide creation system 100.

The presentation slide review user interface flow 300 includes an initial user interface 302 that allows the user to enter a title 320 and keywords 322 that indicate the contents that are to be generated for a presently created presentation slide. The presentation slide review user interface flow 300 also depicts a first presentation slide display 304 and a second presentation slide display 306. In an example, the first presentation slide display 304 presents the title 320 an initial set of contents that includes a first line 342, a second line 344, and a third line 346. In such an example, the second presentation slide display 306 presents the title 320 and a subsequent set of contents that includes first line 342 and the third line 346 but where the second line 344 has been replaced by a fourth line 360.

The first presentation slide display 304 in an example presents the contents of an initial presentation side as created by the presentation slide generation processor 201 based on the information provided by a user via the initial user interface 302. The first presentation slide display 304 allows a user to view the contents of the initial presentation slide that was automatically generated by the presentation slide generation processor 201. In an example, the first presentation slide display 304 presents an initial presentation slide and allows the user to select part or all of the generated content for examination or removal from that presentation slide.

In the depicted example, the user has selected line 2 344 of the first presentation slide display 304 as content to be examined. In general, a user is able to select part of the contents of a presentation slide by any suitable user interface technique. A delete icon 348, which is an "X" in this example, is presented when the user selects line 2 344. In an example, the user is able to select the delete icon 348 by any suitable user interface facilities. In an example, a user's selection of part of the contents of a presentation slide, such as selecting line 2 344, causes a display of part of the source document 350 from which the part of the contents was derived, and the particular part of the source document from which the selected content was derived 352 is indicated.

When the delete icon 348 in this example is selected, line 2 344 is removed from the initial presentation slide. A user's selecting the delete icon 348 is an example of receiving an input indication rejection of line 2 344, where line 2 344 is an abstractive summary of portions of the source document 350. In some examples, the contents of line 2 344 is added to a training data set and used by the above described training processor 220 to further train the machine learning models of the dense vector information retrieval machine learning module 204 and the closed-domain long-form question answering machine learning module 208 as shown by the update models block 308. After these machine learning models are updated, the presentation slide generation processor 201 reiterates processing and generates the fourth line 360. The initial presentation slide of the first presentation slide display 304 is then changed into the second presentation slide display 306 by replacing the second line 344 with the newly created fourth line 360.

Figure 4:
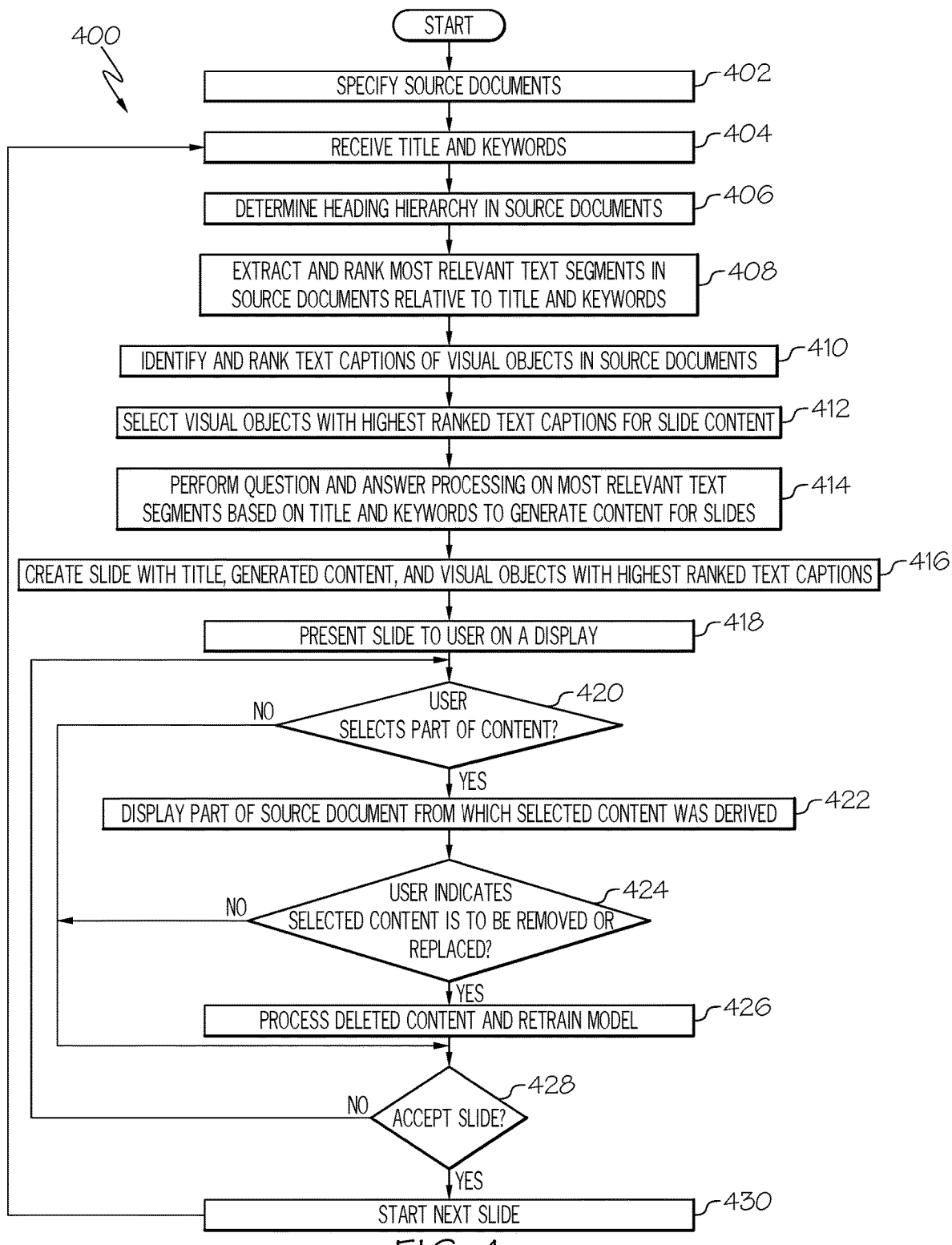
FIG. 4 illustrates a presentation slide creation process, according to an example.

FIG. 4 illustrates a presentation slide creation process 400, according to an example. The presentation slide creation process 400 is an example of a process performed by the presentation slide generation processor 201 to automate the creation of presentation slides from the contents of one or more source documents. This description of the presentation slide creation process 400 refers to the slide creation flow diagram 200 described above.

The presentation slide creation process 400 allows a user to specify, at 402, source documents that are to be used as information sources for the content of the created presentation slides. An example of specifying source documents includes using the source file selection facility 236 to specify one or more source documents that are to be used as sources of information from which to derive content for the created presentation slides.

The presentation slide creation process 400 receives, at 404, a title for a presentation slide that is being currently created and any keywords that further define the desired content to be generated for that presentation slide. In an example, the title is entered via the title entry facility 232 and keywords are entered via keywords entry facility 234. In some instances, a user is able to enter only a title for a particular presentation slide and not enter any keywords. In such an example, the processing to generate content for that particular presentation slide is based on the provided title without further refinements by provided keywords.

The presentation slide creation process 400 determines, at 406, a hierarchy of headings in the source documents. An example of this determination is discussed above with regards to the keyword module 205.

The presentation slide creation process 400 extracts and ranks, at 408, according to relevance of the text segments in the source documents relative to the title and any provided keywords. An example of such extraction and ranking are described above with regards to the dense vector information retrieval machine learning module 204.

The presentation slide creation process 400 identifies and ranks, at 410, text captions of visual objects in the source documents.

The presentation slide creation process 400 selects, at 412, visual objects with the highest ranked text captions for use as slide contents.

The presentation slide creation process 400 performs question and answer processing, at 414, on the extracted text segments that were ranked as most relevant to the text and any keywords to generate content for presentation slides.

The presentation slide creation process 400 creates, at 416, a slide with the title, the generated content and any visual objects associated with the highest ranked text captions.

The presentation slide creation process 400 presents, at 418, the created presentation slide is presented on a display to a user.

The presentation slide creation process 400 determines, at 420, if a user has selected part of the content contained in the displayed presentation slide. If the user has selected part of the content, the part of the source document from which the selected content was derived is displayed, at 422. A determination is made, at 424, as to whether the user has selected to delete or replace the selected content. If the user selected to delete or replace the selected content, the deleted content is processed, at 428, and the machine learning models are retrained using the deleted or replaced content as a negative sample of the training corpus.

Returning to the above determinations: if the user did not select, at 420, part of the content; did not indicate, at 424, that the selected content is to be removed or replaced; or after the models are retrained, at 428, a determination is made, at 430, as to whether the user accepted the presently displayed presentation slide. If the user does not accept the presently displayed presentation slide, processing returns to determining, at 420, whether the user selects part of the content of the presently display presentation slide, and performs the subsequent processing as described below.

If it is determined, at 430, that the user accepted the presently displayed presentation slide, the presentation slide creation process 400 starts, at 432, the next presentation slide. In an example, starting the next presentation slide includes storing the presently displayed presentation slide, performing other processing to complete the present presentation slide, and preparing processing to create the next presentation slide. The presentation slide creation process 400 then returns to receiving, at 404, a title and keywords for the next slide, and performing the subsequent processing as discussed above.

Figure 5:
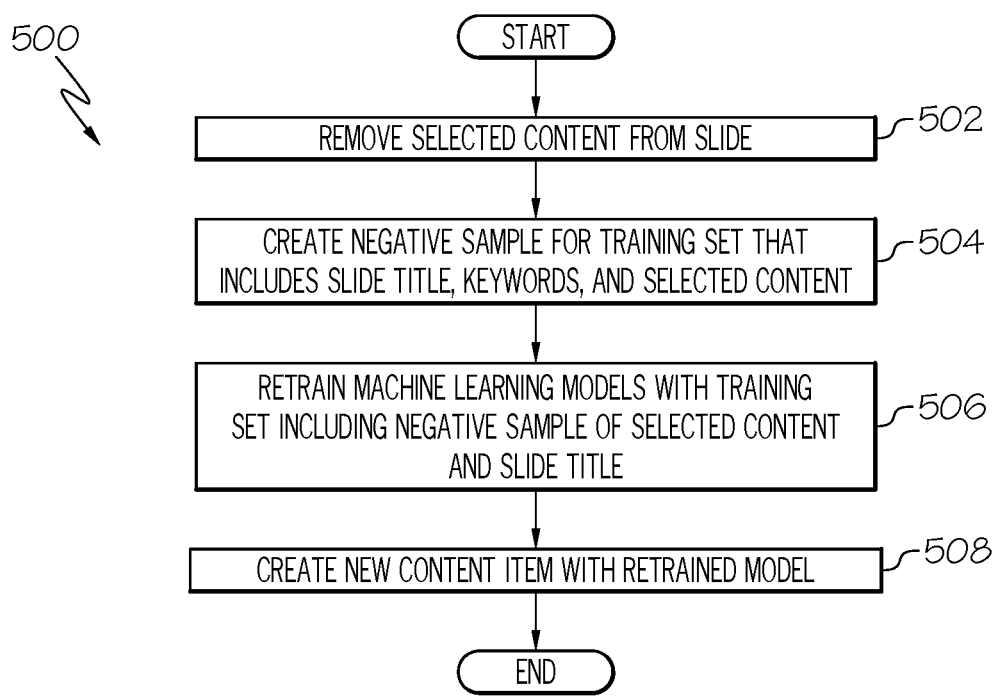
FIG. 5 illustrates a deleted content removal process, according to an example.

FIG. 5 illustrates a deleted content removal process 500, according to an example. The deleted content removal process 500 is an example of processing performed by the process deleted content and retrain model 428 described above.

The deleted content removal process 500 removes, at 502, the content selected by the user from the presently presented presentation slide. In an example, the removed content is able to be a text element created by the closed-domain long-form question answering machine learning module 208, a visual object, other content, or combinations of these.

A negative sample for a training set is created, at 504, that includes the title of the presently presented presentation slide, the user provided keywords, and the content that is selected to be removed. In an example, a user's removing a visual object causes the negative sample to contain the text capture of the visual object that is to be removed.

The machine learning models used by the presentation slide generation processor 201 are retrained, at 506, with a training set that includes the created negative sample. In some examples, one or more of the dense vector information retrieval machine learning module 204 or the closed-domain long-form question answering machine learning module 208 are retrained with this new training set.

A new content item is created, at 508, for the presently presented presentation slide using the retrained models. In examples where the user has selected on only delete selected content, this new item is not created. The deleted content removal process 500 then ends.

Figure 6:
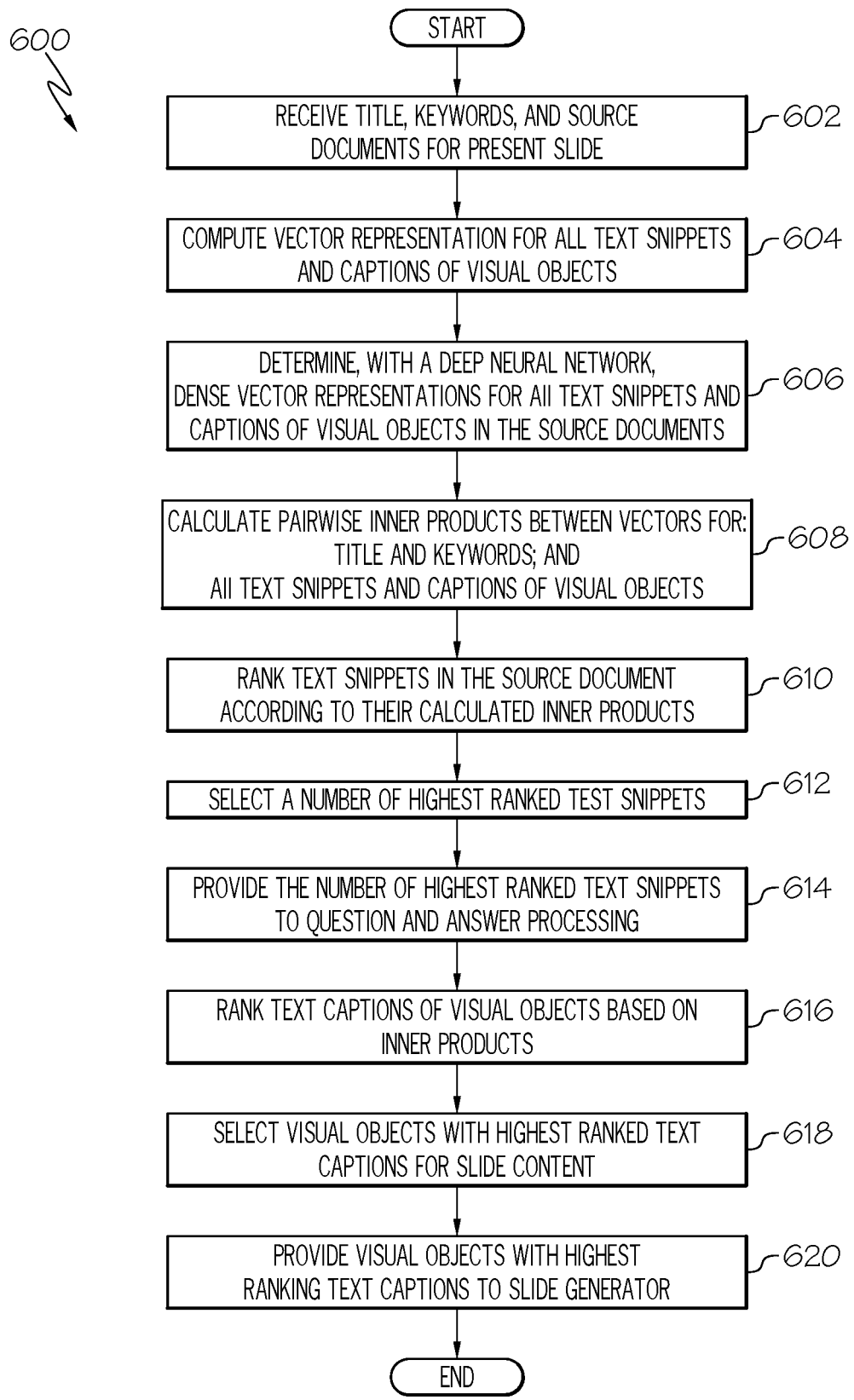
FIG. 6 illustrates a dense vector information retrieval process, according to an example.

FIG. 6 illustrates a dense vector information retrieval process 600, according to an example. The dense vector information retrieval process 600 is an example of processing performed by the dense vector information retrieval machine learning module 204 described above.

The dense vector information retrieval process 600 receives, at 602, the title, keywords and source documents for a present slide. As discussed above, the title, keywords and source documents are specified by the user in an example via the user interface 230. In some iterations, a user is able to specify only one source document, no keywords, or both one source document and no key words.

The dense vector information retrieval process 600 computes, at 604, a vector representation for all text snippets and captions of visual objects in the source documents. 202

The dense vector information retrieval process 600 determines, at 606, with a deep neural network, dense vector representations for all text snippets and captions of visual objects in the source documents. 202

The dense vector information retrieval process 600 calculates, at 608, pairwise inner products between vectors for: the title and keywords; and all text snippets and captions of visual objects.

The dense vector information retrieval process 600 ranks, at 610, text snippets in the source documents according to their calculated inner product with vectors for the title and keywords.

A number of highest ranked snippets are selected, at 612. In an example the ten (10) highest ranked snippets are selected at this point.

The number of highest ranked text snippets are provided, at 614, to question and answer processing. As discussed below, the highest ranked text snippets are provided to a closed-domain long-form question answering machine learning module 208.

The captions of visual objects are ranked, at 616, according to their calculated inner product with vectors for the title and keywords.

Visual objects are selected, at 618, to be included in the contents of the presently created presentation slide based on the ranked text captions The selected visual objects with the highest ranking text captions are provided, at 620, to a presentation slide generator. The dense vector information retrieval process 600 then ends.

Figure 7:
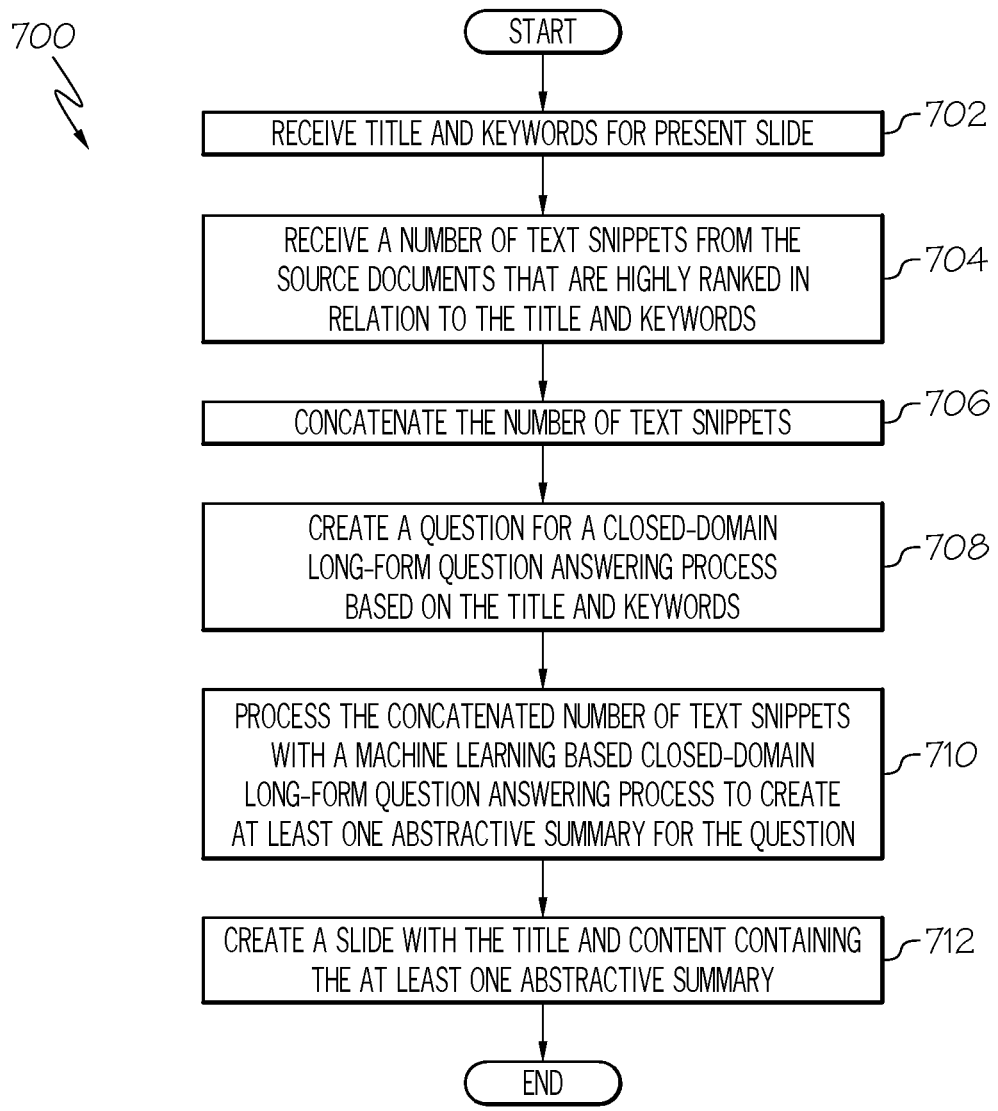
FIG. 7 illustrates a question answer process, according to an example.

FIG. 7 illustrates a question answer process 700, according to an example. The question answer process 700 is an example of processing performed by the closed-domain long-form question answering machine learning module 208 and includes processing by a machine learning based closed-domain, long-form question answering process to create content for generated presentation slides.

The question answer process 700 receives, at 702, a title and keywords for the present presentation slide that is being created. As discussed above, the title and keywords are able to be provided by a user via the user interface 230. In some iterations, the user only provides a title and no keywords for the present presentation slide being created. In such iterations, data is identified or created based upon just the title.

The question answer process 700 receives, at 704, a number of text snippets from the source documents that are highly ranked in relation to the title and keywords. In an example, the number of text snippets were selected at element 612 of the dense vector information retrieval process 600 discussed above. As discussed above, in an example, ten (10) text snippets that are ranked highest with respect to the title and keywords are received.

The received number of text snippets are concatenated, at 706.

A question is formed, at 708, for a closed-domain long-form question answering process based on the received title and keywords.

The concatenated number of text snippets are processed, at 710, with a machine learning based closed-domain long-form question answering process to create at least one abstractive summary for the question.

A slide is created, at 712, with the title and with content containing the at least one abstractive summary created by the machine learning based closed-domain long-form question answering process. The question answer process 700 then ends.

Information Processing System

Figure 8:
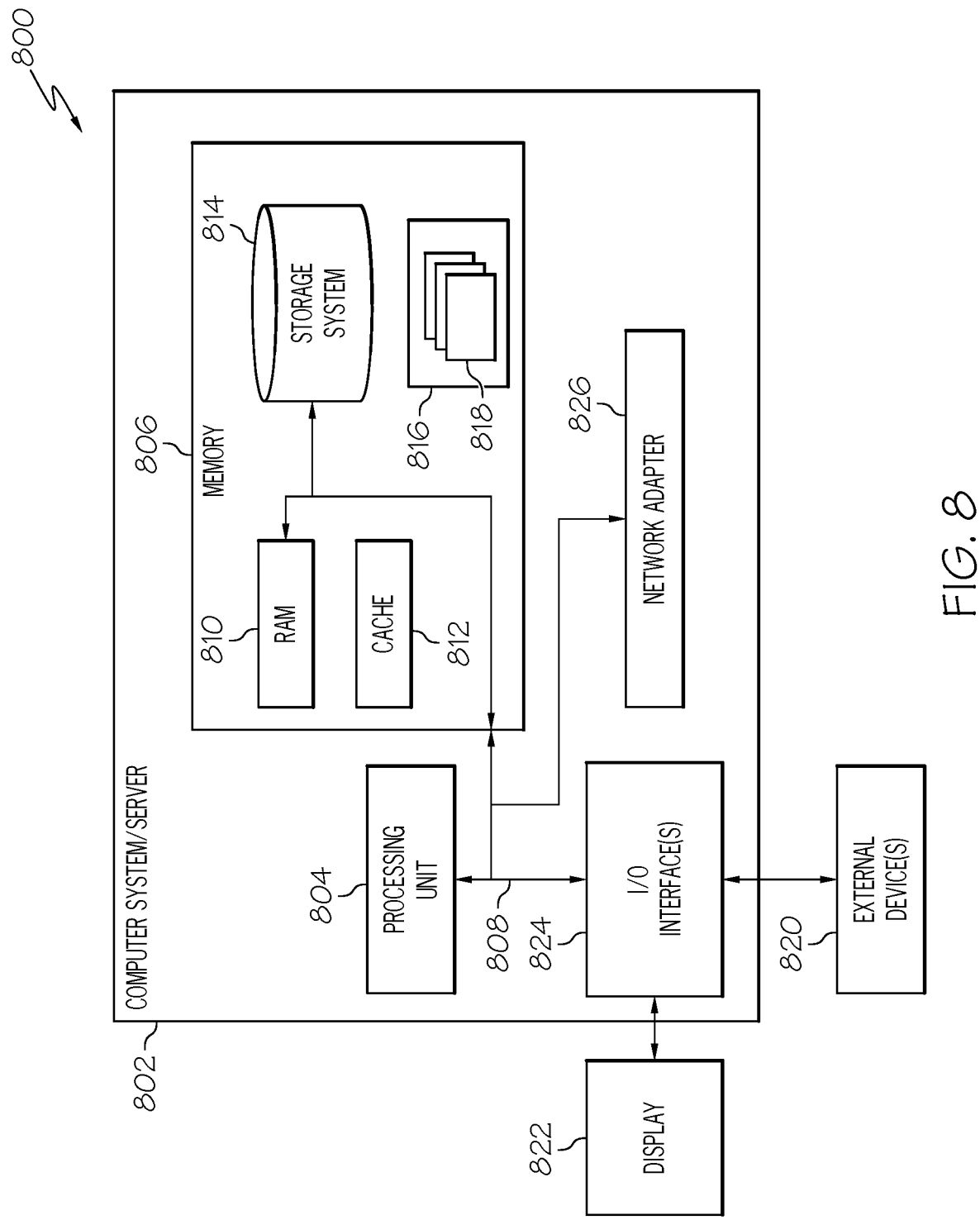
FIG. 8 is a block diagram illustrating one example of an information processing system according to one example.

Referring now to FIG. 8, this figure is a block diagram illustrating an information processing system that can be utilized in various examples of the present disclosure. The information processing system 802 is based upon a suitably configured processing system configured to implement one or more embodiments of the present disclosure. Any suitably configured processing system can be used as the information processing system 802 in embodiments of the present disclosure. In another embodiment, the information processing system 802 is a special purpose information processing system configured to perform one or more embodiments discussed above. The components of the information processing system 802 can include, but are not limited to, one or more processors or processing units 804, a system memory 806, and a bus 808 that couples various system components including the system memory 806 to the processor 804.

The bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 806 can also include computer system readable media in the form of volatile memory, such as random access memory (RAM) 810 and/or cache memory 812. The information processing system 802 can further include other removable/non-removable, volatile/non-volatile computer system storage media. By way of example only, a storage system 814 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. The memory 806 can include at least one program product having a set of program modules that are configured to carry out the functions of various examples described above.

Program/utility 816, having a set of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of the above described processes and systems.

The information processing system 802 can also communicate with one or more external devices 820 such as a keyboard, a pointing device, a display 822, and the like. The information processing system 802 is further able to communicate with one or more devices that enable a user to interact with the information processing system 802; and/or any devices (e.g., network card, modem, etc.) that enable computer system/server 802 to communicate with one or more other computing devices. Such communication can occur via I/O interfaces 824. Still yet, the information processing system 802 can communicate with one or more networks such as a local area network (LAN), a general wide area network (WAN), and/or a public network (e.g., the Internet) via network adapter 826. As depicted, the network adapter 826 communicates with the other components of information processing system 802 via the bus 808. Other hardware and/or software components can also be used in conjunction with the information processing system 802. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for creating presentation slides, the method comprising:
   receiving a title for a presentation slide;
   identifying portions of at least one source document that are relevant to a meaning of the title based on a dense vector information retrieval machine learning process operating on the at least one source document, wherein the dense vector information retrieval machine learning process creates, for each text segment within the at least one source document and for each text segment in the title, respective vector representations that each have a common dimension;
   generating an abstractive summary of the portions of the at least one source document based on a closed-domain long form question answering machine learning process using a context comprising the respective vector representations created by the dense vector information retrieval machine learning process;
   creating a first presentation slide comprising the abstractive summary and the title;
   presenting the first presentation slide to an operator;
   receiving, based on presenting the abstractive summary, an input indicating rejection of the abstractive summary; and
   based on receiving the input that indicates rejection of the abstractive summary:
      removing the abstractive summary from the presentation slide, and
      providing negative training feedback for the abstractive summary to at least one of the dense vector information retrieval machine learning process or the closed-domain long form question answering machine learning process.

2. The method of claim 1, further comprising:
   receiving at least one keyword associated with the presentation slide, and
   wherein at least one of identifying portions of at least one source document that are relevant to a meaning of the title or generating an abstractive summary of the portions of the at least one source document is further based on a context of its closed-domain that comprises a combination of the at least one keyword and the title.

3. The method of claim 1, further comprising:
   determining, by the dense vector information retrieval machine learning process prior to identifying portions of at least one source document, a respective vector representation for each respective text snippet within the at least one source document, and
   where identifying portions of at least one source document that are relevant to a meaning of the title based on the dense vector information retrieval machine learning process on the at least one source document comprises:
      computing a respective pairwise inner product between each respective vector representation of each respective snippet and a vector representation of the title;
      ranking each respective snippet based performing a maximum inner product search of all respective pairwise inner products; and
      identifying, based on ranking each respective snippet, a selected number of the respective snippets as the portions.

4. The method of claim 3, further comprising:
   receiving a set of training presentation slides comprising a first training slide and a second training slide;
   creating a negative sample slide comprising a title from the first training slide and content other than a title from the second training slide; and
   training the dense vector information retrieval machine learning process based on the negative sample slide being a negative example.

5. The method of claim 1,
   where the closed-domain long form question answering machine learning process further identifies, in the at least one source document, a number of top ranked text snippets that relate to the title, and
   where generating the abstractive summary comprises the closed-domain long form question answering machine learning process generating the abstractive summary further based on a context of its closed-domain that comprises a concatenation of the number of top ranked text snippets.

6. The method of claim 1, further comprising:
   receiving, from a source, a training data set comprising training documents and training presentation slides created from the training documents;
   filtering, prior to creating a negative sample slide from the training data set received from the source, the training data set by removing text from the training presentation slides received from the source that is not derivable from the training documents to create a filtered training data set; and
   training the closed-domain long form question answering machine learning process with the filtered training data set.

7. The method of claim 1,
   where the at least one source document comprises at least one visual object, and
   where identifying portions of at least one source document that are relevant to a meaning of the title comprises identifying a relevant visual object from within the at least one visual object that is relevant to the title, and
   where creating the first presentation slide comprises adding the relevant visual object to the first presentation slide.

8. An apparatus for creating presentation slides, the apparatus comprising:
a processor;
a memory coupled to the processor;
a user interface coupled to the processor and the memory that is configured to, when operating, receive a title for a presentation slide;
a presentation slide generator, coupled to the processor and the memory, that when operating is configured to:
identify portions of at least one source document that are relevant to a meaning of the title based on a dense vector information retrieval machine learning process operating on the at least one source document, wherein the dense vector information retrieval machine learning process creates, for each text segment within the at least one source document and for each text segment in the title, respective vector representations that each have a common dimension;
generate an abstractive summary of the portions of the at least one source document based on a closed-domain long form question answering machine learning process using a context comprising the respective vector representations created by the dense vector information retrieval machine learning process; and
create a first presentation slide comprising the abstractive summary and the title,
where the user interface is further configured to, when operating:
present the first presentation slide to an operator; and
receive, based on presenting the abstractive summary, an input indicating rejection of the abstractive summary, and
where the presentation slide generator is further configured to, when operating, based on receiving the input that indicates rejection of the abstractive summary:
removing the abstractive summary from the presentation slide; and
providing negative training feedback for the abstractive summary to at least one of the dense vector information retrieval machine learning process or the closed-domain long form question answering machine learning process.

9. The apparatus of claim 8, where the user interface is further configured to, when operating receive at least one keyword associated with the presentation slide, and
where the presentation slide generator is further configured to, when operating, generate an abstractive summary of the portions of the at least one source document further based on a context of its closed-domain that comprises a combination of the at least one keyword and the title.

10. The apparatus of claim 8, where the user interface is further configured to, when operating receive at least one keyword associated with the presentation slide, and
where the presentation slide generator is further configured to, when operating, identify portions of at least one source document that are relevant to a meaning of the title further identifies portions of the at least one source document based on the at least one keyword.

11. The apparatus of claim 8, where the presentation slide generator is further configured to, when operating:
determine, by the dense vector information retrieval machine learning process prior to identifying portions of at least one source document, a respective vector representation for each respective text snippet within the at least one source document, and
identify portions of at least one source document that are relevant to a meaning of the title based on the dense vector information retrieval machine learning process on the at least one source document by at least:
computing a respective pairwise inner product between each respective vector representation of each respective snippet and a vector representation of the title;
ranking each respective snippet based performing a maximum inner product search of all respective pairwise inner products; and
identifying, based on ranking each respective snippet, a selected number of the respective snippets as the portions.

12. The apparatus of claim 8,
where the closed-domain long form question answering machine learning process further identifies, in the at least one source document, a number of top ranked text snippets that relate to the title, and
the presentation slide generator is further configured to, when operating, generate the abstractive summary by at least the closed-domain long form question answering machine learning process generating the abstractive summary further based on a context of its closed-domain that comprises a concatenation of the number of top ranked text snippets.

13. The apparatus of claim 8, further comprising a training processor that is configured to, when operating:
receive a training data set comprising training documents and training presentation slides created from the training documents;
filter, prior to creating a negative sample slide from the training data set received from the source, the training data set by removing text from the training presentation slides received from the source that is not derivable from the training documents to create a filtered training data set; and
train the closed-domain long form question answering machine learning process with the filtered training data set.

14. The apparatus of claim 8,
where the at least one source document comprises at least one visual object, and
where the presentation slide generator is further configured to, when operating, identify portions of at least one source document that are relevant to a meaning of the title by at least identifying a relevant visual object from within the at least one visual object that is relevant to the title, and
create the first presentation slide by at least adding the relevant visual object to the first presentation slide.

15. A computer program product for creating presentation slides, the computer program product comprising:
a storage medium readable by a processing circuit and storing instructions for execution by a processing circuit for performing a method comprising:
receiving a title for a presentation slide;
identifying portions of at least one source document that are relevant to a meaning of the title based on a dense vector information retrieval machine learning process on the at least one source document, wherein the dense vector information retrieval machine learning process creates, for each text segment within the at least one source document and for each text segment in the title, respective vector representations that each have a common dimension;
generating an abstractive summary of the portions of the at least one source document based on a closed-domain long form question answering machine learning process using a context comprising the respective vector representations created by the dense vector information retrieval machine learning process;

creating a first presentation slide comprising the abstractive summary and the title;

presenting the first presentation slide to an operator;

receiving, based on presenting the abstractive summary, an input indicating rejecting the abstractive summary; and based on receiving the input that indicates rejection of the abstractive summary:

removing the abstractive summary from the presentation slide, and providing negative training feedback for the abstractive summary to at least one of the dense vector information retrieval machine learning process or the closed-domain long form question answering machine learning process.

16. The computer program product of claim 15, wherein the method further comprises:

determining, by the dense vector information retrieval machine learning process prior to identifying portions of at least one source document, a respective vector representation for each respective text snippet within the at least one source document, and where identifying portions of at least one source document that are relevant to a meaning of the title based on a dense vector information retrieval machine learning process on the at least one source document comprises:

computing a respective pairwise inner product between each respective vector representation of each respective snippet and a vector representation of the title;

ranking each respective snippet based performing a maximum inner product search of all respective pairwise inner products; and identifying, based on ranking each respective snippet, a selected number of the respective snippets as the portions.

17. The computer program product of claim 15, where the closed-domain long form question answering machine learning process further identifies, in the at least one source document, a number of top ranked text snippets that relate to the title, and where generating the abstractive summary comprises the closed-domain long form question answering machine learning process generating the abstractive summary further based on a context of its closed-domain that comprises a concatenation of the number of top ranked text snippets.

18. The method of claim 1, further comprising:

extracting a hierarchical structure of sections headers in the at least one source document; and extracting, based on the title, at least one keyword from the hierarchical structure of sections headers, wherein at least one of identifying portions of at least one source document that are relevant to a meaning of the title or generating an abstractive summary of the portions of the at least one source document is further based on a context of its closed-domain that comprises a combination of the at least one keyword and the title.

19. The method of claim 18, further comprising creating a subtree branch by recursively including child header title text with a respective title of each header in the hierarchical structure of section headers, and wherein extracting at least one keyword comprises extracting the at least one keyword from the subtree branch.

20. The method of claim 1, further comprising:

receiving at least one keyword associated with the presentation slide, and wherein the dense vector information retrieval machine learning process identifies portions of at least one source document that are relevant to a meaning of the title based upon a weighted ranking function using vector representations of the title, passages in the at least one source document, and the at least one keyword, wherein the weighted ranking function comprises a calculation as follows:

$$\alpha(\text{emb}_{title} \bullet \text{emb}_{text}) + (1-\alpha)(\text{emb}_{title} \bullet \text{emb}_{keyword})$$

where:

"$\text{emb}_{title}$" comprises embedding as represented by vector representations of the title;

"$\text{emb}_{text}$" comprises embedding as represented by vector representations of the passages in the at least one source document; and "$\text{emb}_{keyword}$" comprises embedding as represented by vector representations of the at least one keyword.

* * * * *